United States Patent [19]

Kamaike

[11] Patent Number: 4,554,999
[45] Date of Patent: Nov. 26, 1985

[54] CONTROL APPARATUS FOR A.C. ELEVATOR

[75] Inventor: Hiroshi Kamaike, Inazawa, Japan

[73] Assignee: Mitsubishi Denki Kabushiki Kaisha, Japan

[21] Appl. No.: 604,010

[22] Filed: Apr. 26, 1984

[30] Foreign Application Priority Data

May 4, 1983 [JP] Japan .................................. 58-78057

[51] Int. Cl.$^4$ ............................................. B66B 5/00
[52] U.S. Cl. .................................. 187/29 R; 187/29 A; 307/66; 320/22; 320/44; 318/376; 318/800
[58] Field of Search .............................. 187/29 R, 29; 318/800–806, 376, 377; 363/35, 37, 98; 320/14, 37, 22–24, 45, 44; 307/64–68, 72, 73, 75

[56] References Cited

U.S. PATENT DOCUMENTS

| | | | |
|---|---|---|---|
| 3,409,815 | 11/1968 | Wright et al. | 320/37 X |
| 3,585,482 | 6/1971 | Zelina | 320/22 X |
| 3,735,234 | 5/1973 | Godard | 320/44 |
| 3,902,573 | 9/1975 | Grove | 187/29 R |
| 3,950,689 | 4/1976 | Jamison | 320/14 X |
| 4,246,633 | 1/1981 | Borkovitz | 363/37 |
| 4,253,054 | 2/1981 | Steigerwald | 320/14 |
| 4,316,097 | 2/1982 | Reynolds | 187/29 R X |
| 4,340,823 | 7/1982 | Miyazawa | 307/66 |
| 4,376,471 | 3/1983 | Uchino et al. | 187/29 R |
| 4,456,097 | 6/1984 | Salihi | 187/29 R |

FOREIGN PATENT DOCUMENTS

| | | |
|---|---|---|
| 2020098 | 10/1980 | European Pat. Off. |
| 356165 | 9/1931 | United Kingdom |
| 410842 | 5/1932 | United Kingdom |
| 463992 | 12/1935 | United Kingdom |
| 576328 | 3/1946 | United Kingdom |
| 2020451 | 11/1979 | United Kingdom |
| 2090084 | 6/1981 | United Kingdom |

OTHER PUBLICATIONS

"Otis Unveils Variable Frequency Drive", Elevator World, Dec. 1982, pp. 63–66.

*Primary Examiner*—William M. Shoop, Jr.
*Assistant Examiner*—Shik Luen Paul Ip
*Attorney, Agent, or Firm*—Leydig, Voit & Mayer

[57] ABSTRACT

An apparatus for controlling an A.C. elevator comprising: A charging device, a discharging device, an inverter, current detecting means for detecting the current flowing between an A-C power supply and D-C batteries and through said charging and discharging devices, and a charging and discharging rate control circuit responsive to the output of said current detecting means for controlling the charging and discharging rates of said D-C batteries as the load conditions of the car of said elevator change so as to cause said charging and discharging of said batteries to be minimum so that the element of said batteries is not shortened.

15 Claims, 7 Drawing Figures

CONTROL APPARATUS FOR A.C. ELEVATOR

BACKGROUND OF THE INVENTION

This invention relates to improvements in an apparatus for controlling an A.C. elevator.

Recently, owing to the progress of power electronic elements as well as the technology for controlling them, an apparatus wherein an induction motor is supplied with variable-voltage and variable-frequency A.C. power by the use of an inverter so as to drive a cage while performing a speed control has been proposed in, for example, 'ELEVATOR WORLD (published by ELEVATOR WORLD, INC.)', DECEMBER 1982, pp. 63–67, "OTIS UNVEILS VARIABLE FREQUENCY DRIVE", and is shown in FIG. 1.

Referring to the figure, numeral 1 designates a single-phase A.C. power source, to which a charging current-limiting resistor 2 is connected. Numeral 3 designates a single-phase full-wave rectifier circuit which is composed of diodes 3A–3D connected to the A.C. power source 1 through the resistor 2 and which converts single-phase alternating current into direct current. Numeral 4 indicates batteries which are connected on the D.C. side of the rectifier circuit 3. Shown at numeral 5 is an inverter of the well-known PWM type which is composed of transistors 5A–5F (or gate turnoff transistors) connected to the batteries 4. Every two of the transistors 5A–5F connected in series, diodes 5a–5f are connected in parallel therewith. The inverter 5 inverts a fixed D.C. voltage into a variable-voltage and variable-frequency A.C. voltage by pulse width control. A three-phase induction motor 6 is connected on the A.C. side of the inverter 5. A driving sheave 7 for a hoist is driven by the motor 6 A main rope 8 is wound round the sheave 7. Connected to the main rope 8 are a cage 9 and a balance weight 10.

Owing to the D.C. power converted by the rectifier circuit 3, a fixed quantity of charging current flows into the batteries 4. When the cage 9 is to move, the transistors 5A–5F of the inverter 5 turn "on" successively in accordance with the running direction of the cage, to generate the variable-voltage and variable-frequency A.C. power in a phase sequence corresponding to the running direction. Thus, the motor 6 starts in a direction determined by the phase sequence of its inputs, and the cage 9 begins to run. Under a certain running state of the cage 9, however, the motor 6 produces regenerative power, which is restored to the power source side through the inverter 5. That is, the charges having been stored in the batteries 4 are discharged to the motor 6 through the inverter 5, or conversely the batteries 4 are charged through the inverter 5.

FIG. 2 illustrates an example of such operation, that is, the charged and discharged states of the batteries 4 in the case where heavy load ascent and descent operations have successively arisen. In the figure, $T_1$ indicates the period of time of the heavy load ascent operation, and $T_2$ the period of time of the heavy load descent operation. $t_1$ denotes an acceleration time interval, $t_2$ a constant-speed running time interval, and $t_3$ a deceleration time interval. Similarly, $t_4$–$t_6$ denote an acceleration time interval, a constant-speed running time interval and a deceleration time interval, respectively.

During the acceleration time interval $t_1$ of the heavy load ascent operation, the motor 6 consumes high power, and hence, the quantity of discharge is large. The power consumption is next to the above during the constant-speed running time interval $t_2$, and power is scarcely consumed during the deceleration time interval $t_3$. During the acceleration time interval $t_4$ of the heavy load descent operation, the cage is accelerated by the force of gravity based on the heavy load thereof, and hence, the charges of the batteries 4 are scarcely discharged. The batteries are somewhat charged by the regenerative power during the constant-speed running time interval $t_5$, and are considerably charged during the deceleration time interval $t_6$. As illustrated in FIG. 1, the batteries 4 are charged by the A.C. power source 1 at all times. However, when they are charged by the regenerative power, a great charging current cannot be caused to flow because of the prevention of the overcharge thereof. Thus, the charges in the batteries 4 change as $Q_0 \to Q_1 \to Q_2$ as illustrated by a curve QA in FIG. 2. The repetition of such abrupt charge and discharge is peculiar to the batteries 4 for the elevator controlled by the inverter.

The repetition of the charge and discharge, however, seriously affects the lifetime of the batteries 4. The shortening of the lifetime due to the charge and discharge is fatal to an apparatus for use in an equipment such as the elevator which must guarantee a long lifetime (15–20 years), and it has hindered putting the apparatus into practical use.

SUMMARY OF THE INVENTION

This invention improves the drawback described above, and has for its object to provide a control apparatus for an A.C. elevator in which the charging rate of batteries is controlled in accordance with the discharging rate thereof, whereby the lifetime of the batteries can be prevented from being shortened.

PREFERRED EMBODIMENTS OF THE INVENTION

An embodiment of this invention will now be described with reference to FIGS. 3 to 6.

Figure 3:
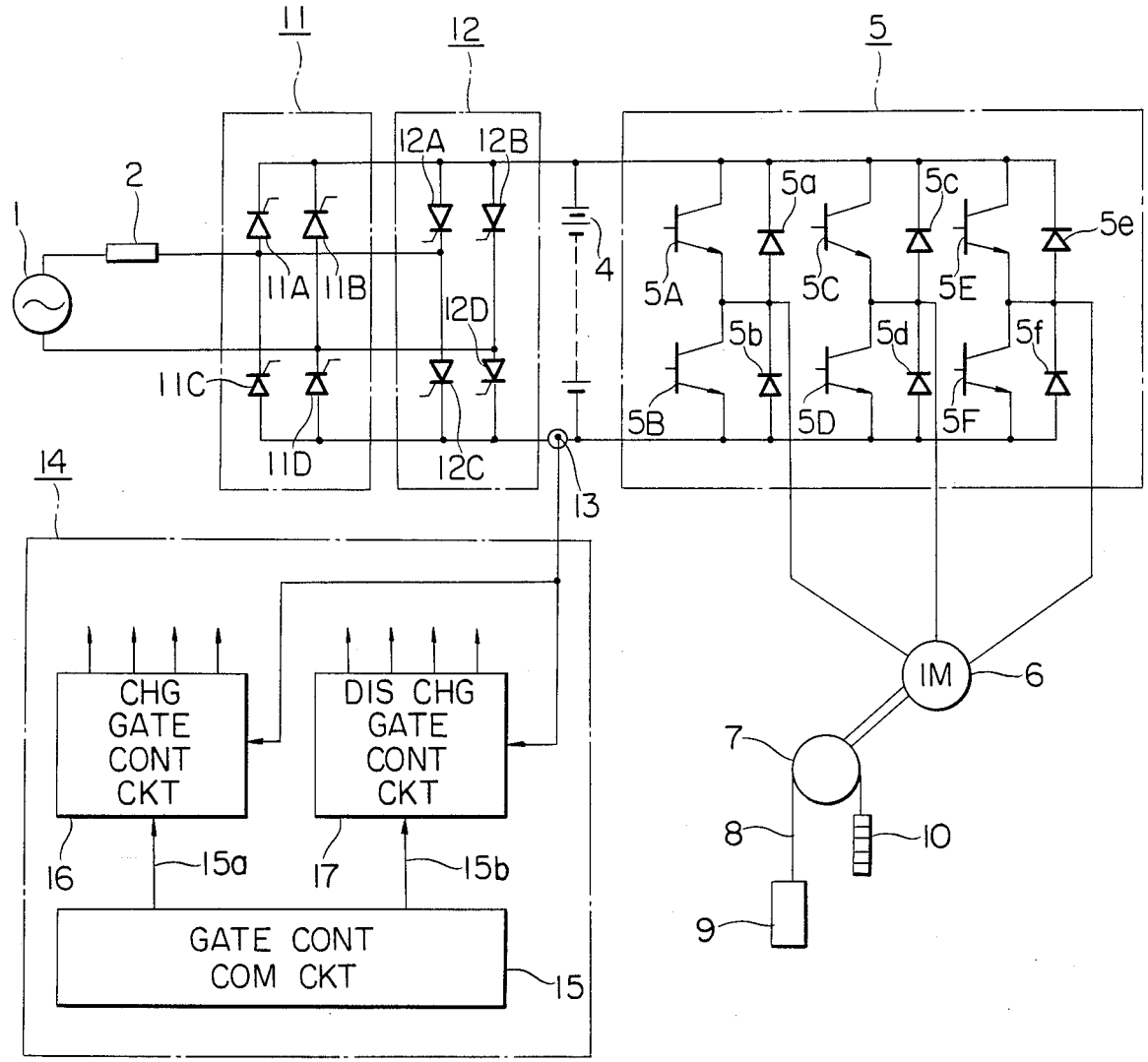
FIG. 3 is a circuit diagram showing an embodiment of a control apparatus for an A.C. elevator according to this invention.
Figure 4:
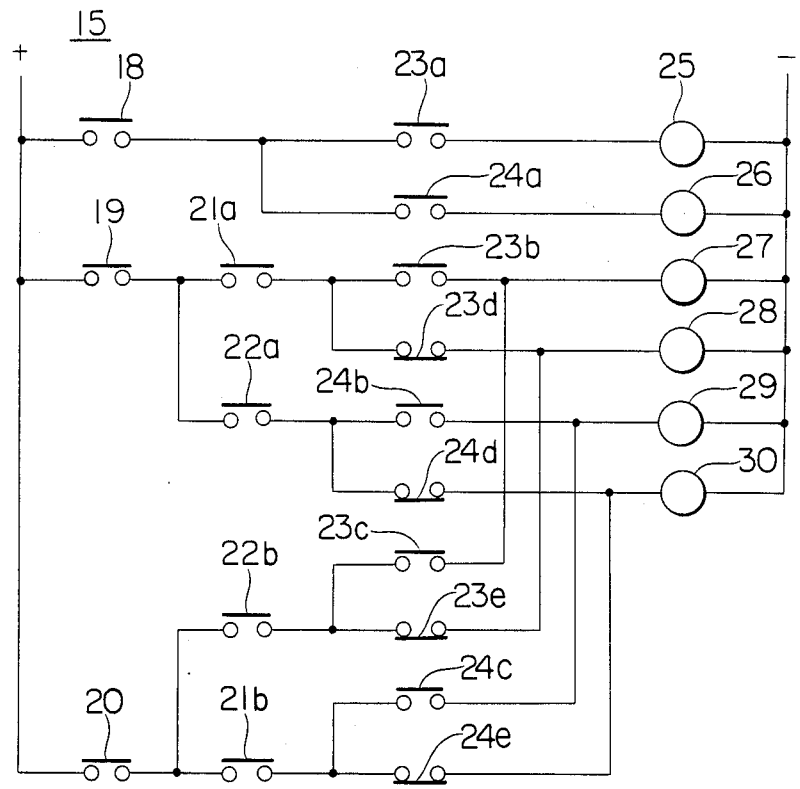
FIGS. 4 and 5 are diagrams of a gate control command circuit in FIG. 3.
Figure 5:
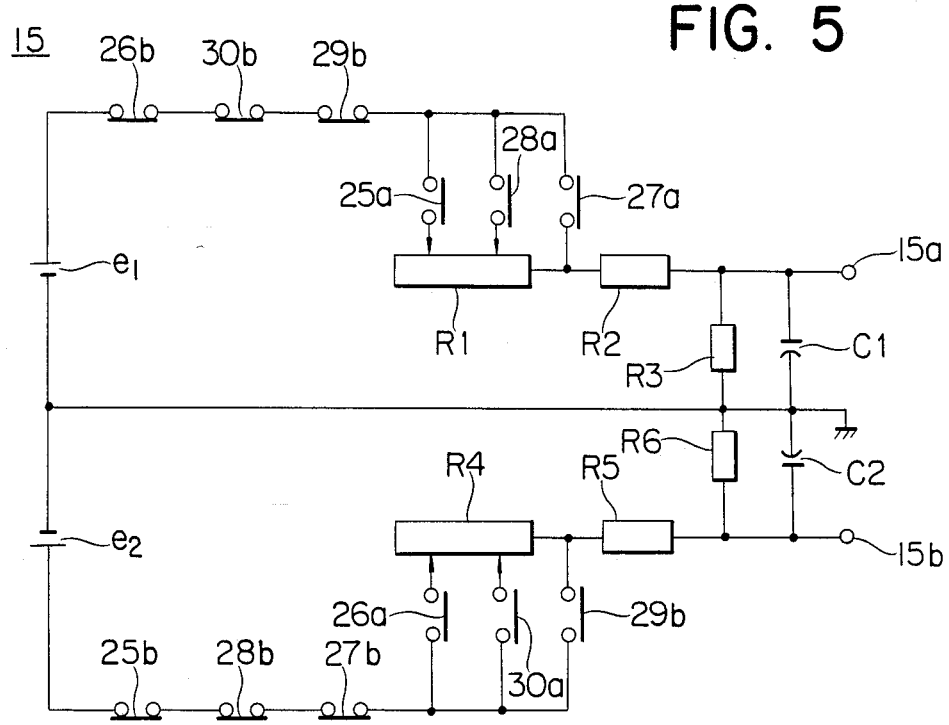
Figure 6:
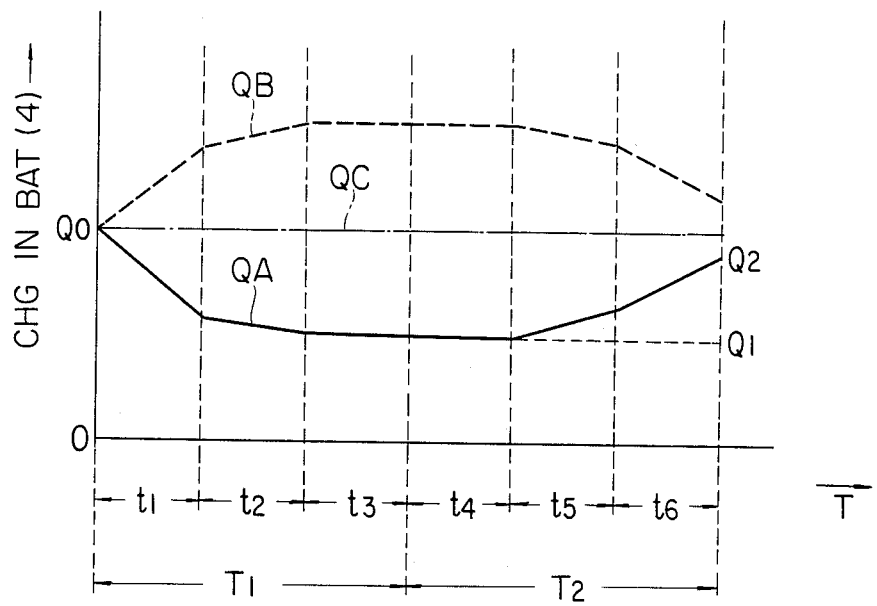
FIG. 6 is a diagram showing the charging and discharging rate curve of batteries in FIG. 3.

In FIG. 3, numeral 11 designates a charging device composed of thyristors 11A–11D which are connected to an A.C. power source 1 through a resistor 2 and which constitutes a single-phase full-wave rectifier circuit, while numeral 12 designates a discharging device composed of thyristors 12A–12D which are connected in the reverse direction to that of the thyristors in the charging device 11. A current detector 13 is inserted in a line which connects the D.C. side of the charging and discharging devices 11, 12 and the D.C. side of an inverter 5. Shown at numeral 14 is a charging and discharging rate control circuit. Numeral 15 indicates a gate control command circuit the details of which are shown in FIG. 4 and which generates a charging gate control command signal 15a and a discharging gate control command signal 15b. Numerals 16 and 17 indicate well-known charging and discharging gate control circuits, respectively, which are controlled by the corresponding command signals 15a, 15b and a current feedback signal from the current detector 13 and which generate charging and discharging gate control signals for controlling the corresponding thyristors 11A-11D and 12A-12D. By way of example, these charging and discharging gate control circuits are ones shown in FIG. 12 of Japanese Patent Application Publication No. 56-39152. In FIG. 4, symbols + and − denote the poles of a D.C. power source. Numeral 18 designates a balanced load detecting relay contact which is closed when the load of a cage 9 is a balanced load (a load at which the cage 9 and a balance weight 10 are balanced), numeral 19 a heavy load detecting relay contact which is closed when the load of a cage is a heavy load, and numeral 20 a light load detecting relay contact which is closed when the load of a cage is a light load. Ascent operation relay contacts 21a and 21b are closed during the ascent operation of the cage 9, while descent operation relay contacts 22a and 22b are closed during the descent operation thereof. Acceleration detecting relay contacts 23a-23c are closed during the acceleration of the cage 9, and acceleration detecting relay contacts 23d and 23e are open during the same. Deceleration detecting relay contacts 24a-24c are closed during the deceleration of the cage 9, and deceleration detecting relay contacts 24d and 24e are open during the same. Numeral 25 indicates a balanced load acceleration detecting relay, which has a normally-open contact 25a and a normally-closed contact 25b as shown in FIG. 5. Numeral 26 indicates a balanced load deceleration detecting relay, which has a normally-open contact 26a and a normally-closed contact 26b. Numeral 27 indicates a light load descent or heavy load ascent acceleration detecting relay, which has a normally-open contact 27a and a normally-closed contact 27b. Numeral 28 indicates a light load descent or heavy load ascent constant speed detecting relay, which has a normally-open contact 28a and a normally-closed contact 28b. Numeral 29 indicates a light load ascent or heavy load descent deceleration detecting relay, which has a normally-open contact 29a and a normally-closed contact 29b. Numeral 30 indicates a light load ascent or heavy load descent constant speed detecting relay, which has a normally-open contact 30a and a normally-closed contact 30b. Symbols $e_1$ and $e_2$ in FIG. 5 denote D.C. voltages, $R_1$-$R_6$ resistors, and $C_1$ and $C_2$ the capacitances of capacitors.

Next, the operation of this embodiment will be described.

For example, when the cage 9 is under the ascent acceleration with a heavy load, the heavy load detecting relay contact 19, ascent operation relay contact 21a and acceleration detecting relay contact 23b are closed. By a circuit consisting of +—19—21a—23b—27——, the light load descent or heavy load ascent acceleration detecting relay 27 is energized to close the contact 27a and to open the contact 27b. In addition, when the cage 9 is under the ascent constant speed operation with the heavy load, the light load descent or heavy load ascent constant speed detecting relay 28 is energized by a circuit consisting of +—19—21a—23d—28——, to close the contact 28a and to open the contact 28b. Thenceforth, the respective detecting relays 25-30 are similarly energized depending upon the load, the running direction and the running state, as follows:

| Load | Under Acceleration | | Under Const. Speed | | Under deceleration | |
|---|---|---|---|---|---|---|
| | Ascent | Descent | Ascent | Descent | Ascent | Descent |
| Light Load | — | 27 | 30 | 28 | 29 | — |
| Balanced Load | 25 | 25 | — | — | 26 | 26 |
| Heavy Load | 27 | — | 28 | 30 | — | 29 |

In the above table, marks "—" indicate that none of the detecting relays 25-30 is energized.

Assuming now that the cage 9 be in the course of the heavy load ascent operation, the contact 27a is closed and the contact 27b is open during the acceleration as described above, and hence, current flows through a circuit consisting of $e_1$—26b—30b—29b—27a—$R_2$—$R_3 \cdot C_1$—$e_1$. Since the resistor $R_1$ is short circuited by the contact 27a, the charging gate control command signal 15a rises from a quantity of charge $Q_0$ in FIG. 6 to a target value of $e_1 \times R_3/(R_2+R_3)$ in accordance with a time constant which is determined by the capacitance $C_1$ and the resistances $R_2$, $R_3$.

During the constant speed, the contact 28a is closed and the contact 28b is open, so that current flows through a circuit consisting of $e_1$—26b—30b—29b—28a—$R_1$——$R_2$—$R_3 \cdot C_1$—$e_1$. Since a part of the resistor $R_1$ is short circuited by the contact 28a, the command signal 15a rises from a quantity of charges at that time to a target value of $e_1 \times R_3/(R_1+R_2+R_3)$ with a time constant which is determined by the capacitance $C_1$ and the resistance $R_1$-$R_3$.

During the deceleration, none of the detecting relays 25-30 is energized, so that the command signal 15a becomes null.

Figure 2:
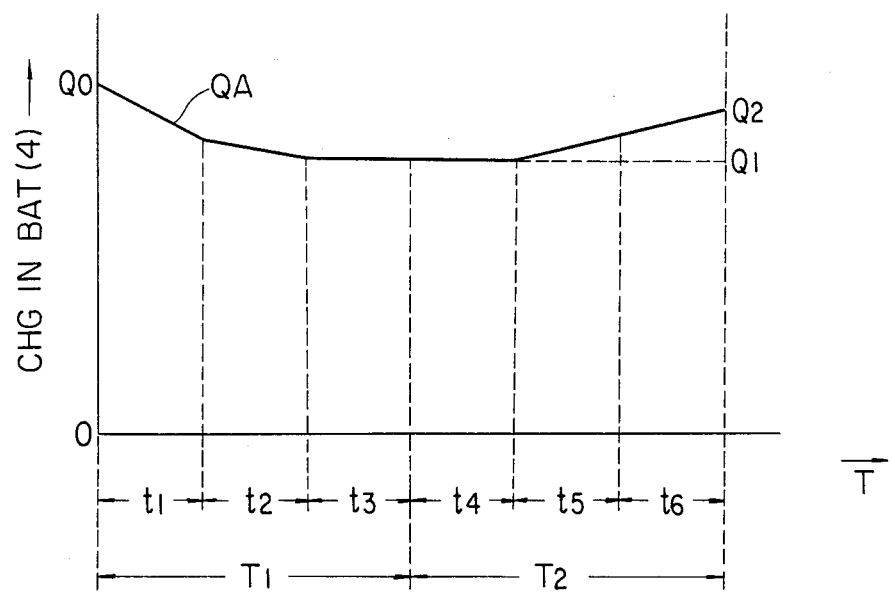
FIG. 2 is a diagram showing the charging and discharging rate curve of batteries in FIG. 1.

In accordance with such command signal 15a, the charging gate control circuit 16 is operated, and the thyristors 11A-11D are controlled to charge the batteries 4. The rate of the charging into the batteries 4 changes as indicated by a curve QB during the period of time of heavy load ascent $T_1$ in FIG. 6. On the other hand, the batteries 4 are discharged in accordance with the curve QA during the same period of time $T_1$ as explained with reference to FIG. 2. As a result, the charges in the batteries 4 are held constant as indicated by a straight line QC.

The case of the heavy load descent operation can be similarly elucidated. In accordance with the command signal 15b, the discharging gate control circuit 17 is operated, and the thyristors 12A-12D are controlled to discharge the batteries 4. The rate of the discharging changes as indicated by the part of the curve QB during the period of time $T_2$ in FIG. 6. On the other hand, the batteries 4 are charged in accordance with the curve QA. Eventually, the charges in the batteries 4 are held constant as indicated by the straight line QC.

The other cases of the load, running direction and running state can be similarly elucidated, and the charges in the batteries 4 are maintained constant at all times.

Figure 1:
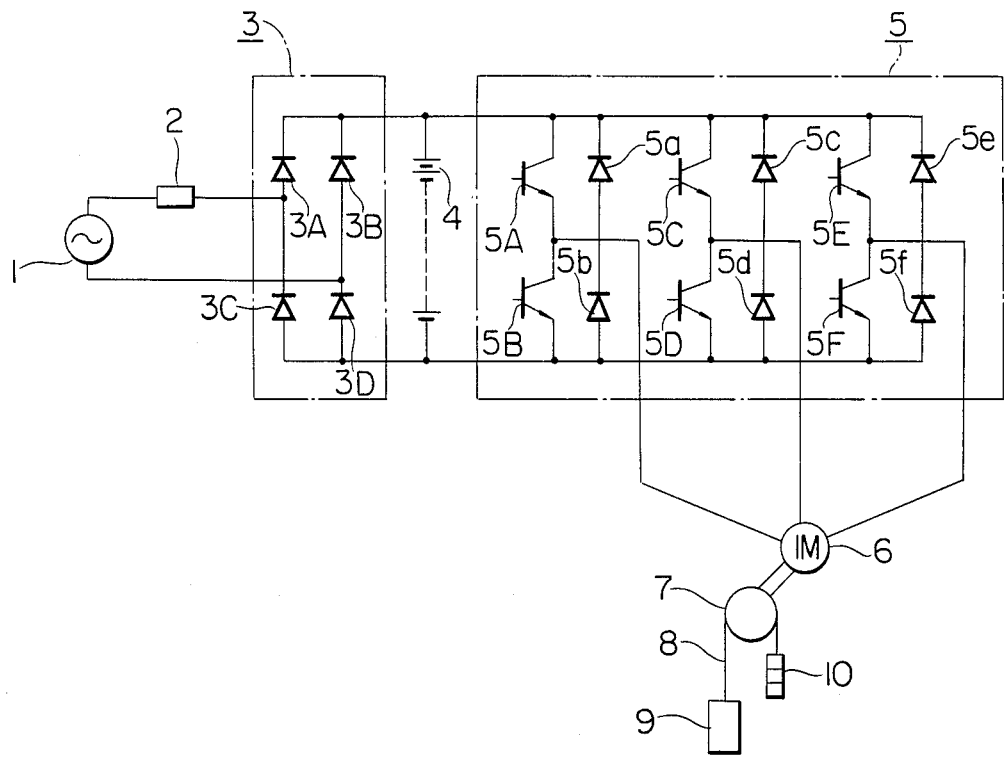
FIG. 1 is a circuit diagram showing a prior-art control apparatus for an A.C. elevator.
Figure 7:
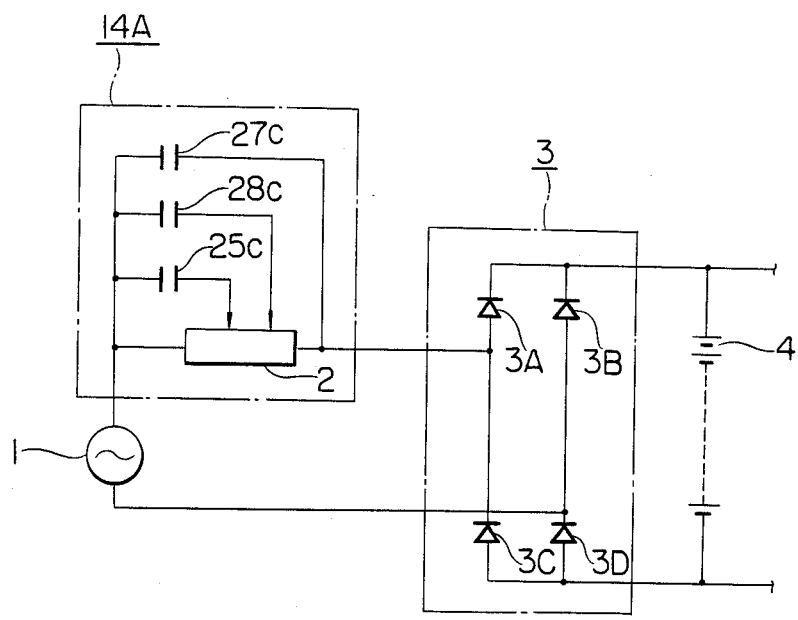
FIG. 7 is a circuit diagram of essential portions showing another embodiment of this invention.

FIG. 7 shows another embodiment of this invention. This embodiment employs a charging rate control circuit 14A which is so arranged that the respective normally-open contacts 25c, 28c and 27c of the balanced load acceleration detecting relay 25, light load descent or heavy load ascent constant speed detecting relay 28 and light load descent or heavy load ascent acceleration detecting relay 27 are connected to the charging current limiter resistor 2 in the circuit of FIG. 1. Accordingly, the discharging device 12 and the charging and discharging gate control circuits 16, 17 in FIG. 3 are not employed.

More specifically, in the embodiment of FIG. 3, the discharging rate and charging rate of the batteries 4 are controlled so as to equalized, whereas in the embodiment of FIG. 7, when the power to be consumed or regenerated by the elevator is within an allowable range, it is disposed of by the discharge or charge of the batteries 4 and the charging and discharging rates are substantially equalized. Only when the batteries 4 are discharged much as in the balanced load acceleration, the light load descent or heavy load ascent constant speed operation and the light load descent or heavy load ascent acceleration, the contacts 25c, 27c and 28c are closed in correspondence with the respective states, to increase the charging rate of the batteries 4 to the extents corresponding to the states.

When this embodiment of FIG. 7 is adopted, the current flowing into or out of the A.C. power source 1 can be decreased, and it is also possible to reduce the capacity of the A.C. power source 1 and the thickness of electric wires.

As set forth above, according to this invention, the rate of charging into batteries which are connected to an inverter for supplying A.C. power to the induction motor of an elevator is controlled in accordance with the rate of discharging from the batteries. Therefore, the abrupt discharge of the batteries can be avoided, and the lifetime of the batteries can be prevented from being shortened.

I claim:

1. A control apparatus for an A.C. elevator including an A.C. power source, an induction motor, a charging device connected to the A.C. power source, batteries connected to the output of the charging device, an inverter connected to invert the output of the batteries and supply said induction motor with a variable-voltage and variable-frequency alternating current, said induction motor being connected to operate a cage, a charging rate control circuit means, and circuit means included in said control circuit means producing an output connected to control said charging device in response to changes in the load and the running direction of the cage to vary the charging rate of said batteries in correspondence with the discharging rate thereof.

2. A control apparatus for an A.C. elevator as defined in claim 1 wherein said charging device is a rectifier circuit which is connected to an A.C. power source.

3. A control apparatus for an A.C. elevator including an A.C. power source, an induction motor, a charging device connected to the A.C. power source, batteries connected to the output of the charging device, an inverter connected to invert the output of the batteries and supply said induction motor with a variable-voltage and variable-frequency alternating current, said induction motor being connected to operate a cage, and a charging rate control circuit means connected to said charging device and said batteries and operated according to the load and running direction of the cage to control said charging device to produce a charging rate of said batteries which is substantially equal to the discharging rate thereof;
   said control circuit including a command circuit including means for detecting the load and the running direction of said cage.

4. A control apparatus for an A.C. elevator as defined in claim 3 wherein said command circuit including said detecting means is included in said control circuit means to generate a signal for compensating the discharging rate of said batteries in response to changes in the load, the running direction and a running state of said cage detected by said detecting means, and said circuit means of said charging rate control circuit means produces an output to control said charging device in response to said signal so that when the discharging rate has increased by an increment, the charging rate is increased in correspondence with the increment, that when the discharging rate has decreased by a decrement, the charging rate is decreased in correspondence with the decrement, and that when the discharging rate does not change, the charging rate is held unchanged.

5. A control apparatus for an A.C. elevator as defined in claim 3 wherein said command circuit detects any of a light load, a balanced load and a heavy load as the load of said cage; any of acceleration running, constant speed running and decceleration running, as the running state of said cage; and any of ascent and descent as the running direction of said cage, and said command circuit generates a signal for controlling said charging rate control circuit on the basis of the detected results.

6. A control apparatus for an A.C. elevator including an A.C. power source, an induction motor, a charging device connected to the A.C. power source, batteries connected to the output of the charging device, an inverter connected to invert the output of the batteries and supply said induction motor with a variable-voltage and variable-frequency alternating current, said induction motor being connected to operate a cage, a charging rate control circuit means, a command circuit included in said control circuit means generating a command signal in response to variations in the load, the running direction and the running state of the cage, and circuit means in said control circuit means producing an output connected to control said charging device in response to said command signal to vary the charging rate of said batteries in correspondence with the discharging rate thereof;
   said command circuit comprising a first device which detects whether or not said cage is under acceleration running with a balanced load; a second device which detects whether or not said cage is under a light load descent constant speed running or heavy load ascent constant speed running; and a third device which detects whether or not said cage is under light load descent acceleration or heavy load ascent acceleration.

7. A control apparatus for an A.C. elevator as defined in claim 6 wherein said command circuit comprises a balanced load detector which detects whether or not the load of said cage is a balanced load; a heavy load detector which detects whether or not the load of said cage is a heavy load; a light load detector which detects whether or not the load of said cage is a light load; an ascent operation detector which detects that said cage is under ascent running; a descent operation detector which detects that said cage is under descent running; an acceleration detector which detects that said cage is under acceleration operation; and a deceleration detector which detects that said cage is under deceleration operation; and said first, second and third devices operate on the basis of outputs from said respective detectors.

8. A control apparatus for an A.C. elevator as defined in claim 6 wherein said command circuit further comprises a fourth device which detects whether or not said cage is under deceleration running with balanced load; a fifth device which detects whether or not said cage is under light load ascent deceleration running or heavy load descent deceleration running; and a sixth device which detects whether or not said cage is under light load ascent constant speed running or heavy load descent constant speed running.

9. A control apparatus for an A.C. elevator as defined in claim 4 wherein said charging device is a rectifier circuit composed of controlled rectifier elements, said rectifier circuit being controlled by a gate control circuit for said controlled rectifier elements, and said gate control circuit being controlled by said command signal from said command circuit.

10. A control apparatus for an A.C. elevator as defined in claim 9 wherein said command circuit includes means for generating a command signal which changes with a time constant predetermined in correspondence with the running direction, load and running state of said cage, and said gate control circuit for said charging device is controlled on the basis of said command signal.

11. A control apparatus for an A.C. elevator as defined in claim 4, further comprising a discharging device connected to control the discharging rate of said batteries and wherein said command circuit is connected to control said discharging device in response to changes in the load, running direction and running state of said cage detected by said detecting means.

12. A control apparatus for an A.C. elevator as defined in claim 11 wherein said discharging device is constructed of a connection of a plurality of controlled rectifier elements and is controlled by a gate control circuit for said controlled rectifier elements, and said gate control circuit is controlled by said command signal of said command circuit.

13. A control apparatus for an A.C. elevator as defined in claim 12 wherein said command circuit includes means for generating a command signal which changes with a time constant predetermined in correspondence with the running direction, load and running state of said cage, and said gate control circuit for said discharging device is controlled on the basis of said command signal.

14. A control apparatus for an A.C. elevator as defined in claim 4 wherein said charging rate control circuit comprises means including a resistor interposed between said charging device and said power source control the charging currrent; and means to change the resistance of said resistor in correspondence with the running direction, load and running state of said cage.

15. A control apparatus for an A.C. elevator as defined in claim 14 wherein said charging rate control circuit increases the charging rate of said batteries when said cage is under the balanced load acceleration, the light load descent constant speed running, the heavy load ascent constant speed running, the light load descent acceleration and the heavy load ascent acceleration.

* * * * *